May 23, 1961 W. L. ROBERTS 2,985,043
SYSTEM FOR CONTROLLING THE SCREW SETTINGS OF A REVERSING MILL
Filed April 24, 1959 2 Sheets-Sheet 1
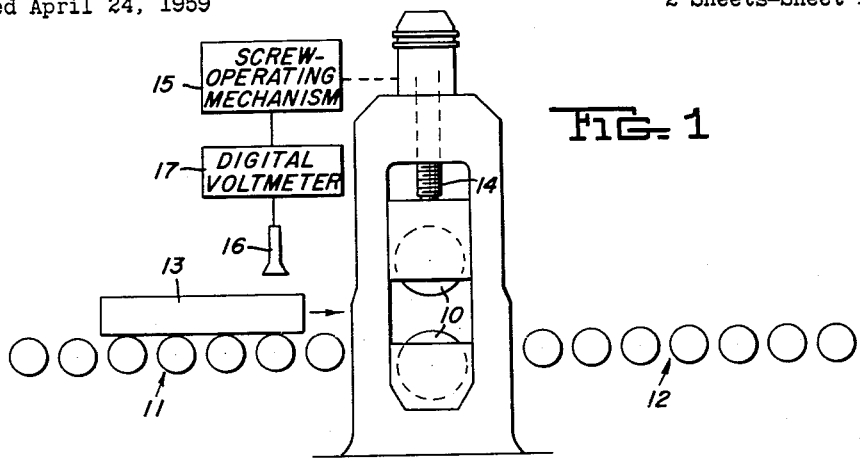
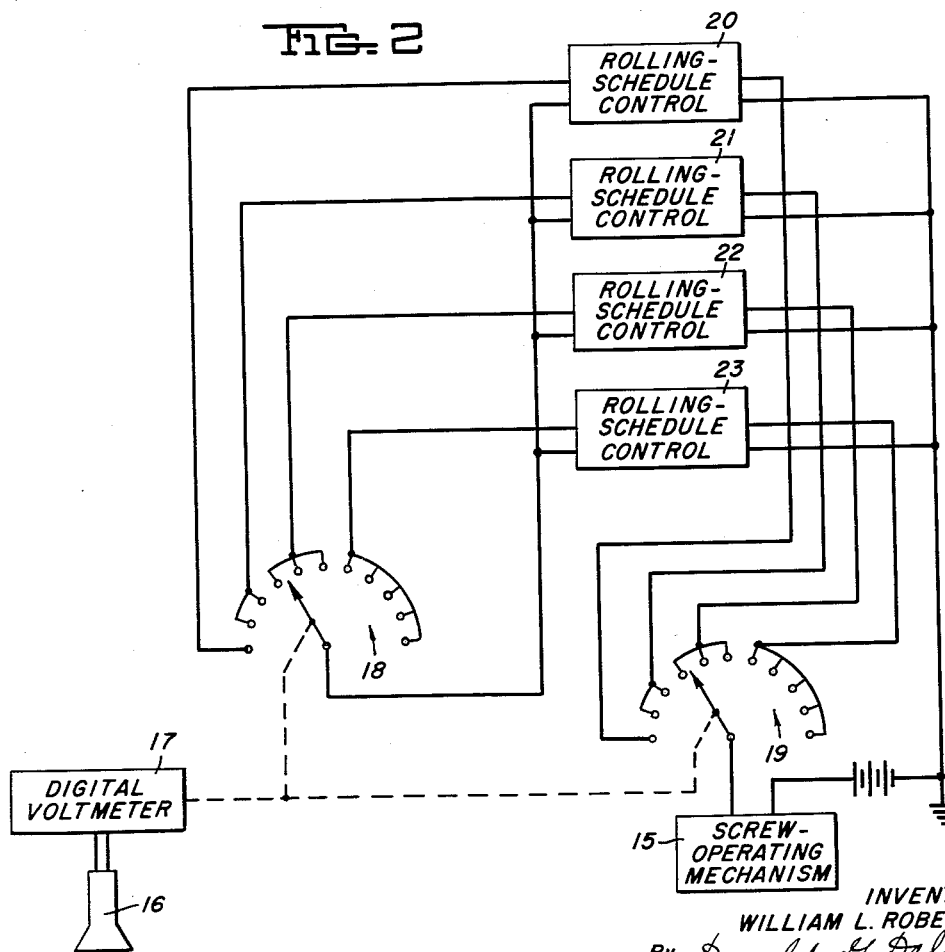
INVENTOR
WILLIAM L. ROBERTS
By Donald G. Dalton
Attorney

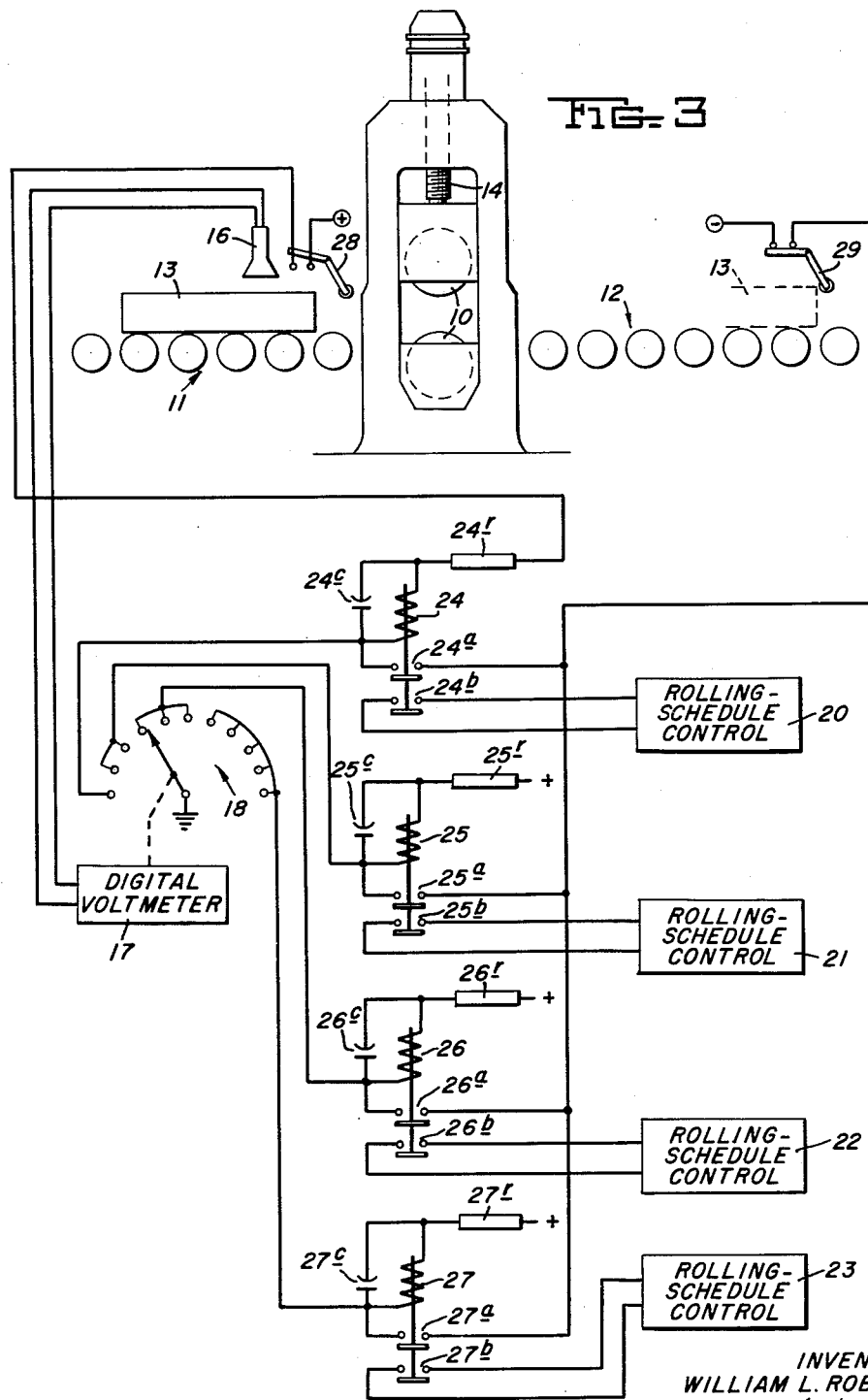

United States Patent Office

2,985,043
Patented May 23, 1961

2,985,043
SYSTEM FOR CONTROLLING THE SCREW SETTINGS OF A REVERSING MILL

William L. Roberts, Monroeville, Pa., assignor to United States Steel Corporation, a corporation of New Jersey Filed Apr. 24, 1959, Ser. No. 808,702

5 Claims. (Cl. 80—56)

This invention relates to rolling mills and, in particular, to a system for controlling the screw settings of a reversing mill so as to effect the greatest possible reduction per pass consistent with the temperature of the piece being rolled.

Normal rolling schedules for blooming or slabbing mills are based on the assumption that the piece being rolled is at a predetermined temperature. For a variety of reasons this may not be true in the case of any particular piece. For pieces of other temperatures, the normal schedule is too slow or too fast depending on whether the temperature is higher or lower than normal. It is the object of my invention, therefore, to change the screw settings for successive passes automatically at rates varying with the temperature of the ingot or bloom being rolled, so that the reduction per pass will be close to the maximum permissible for such temperature, without overloading the mill.

A complete understanding of the invention may be obtained from the following detailed description and explanation which refer to the accompanying drawings illustrating the present preferred embodiment. In the drawings:

Figure 1 is a diagrammatic view of a reversing mill with its entrance and exit conveyor tables, having the invention incorporated therein;

Figure 2 is a simplified circuit diagram showing the arrangement whereby a temperature-responsive means controls the selection of the proper rolling schedule; and Figure 3 is a more complete circuit diagram.

Referring now in detail to the drawings and, for the present, to Figure 1, a rolling mill 10 such as a blooming or slabbing mill, has entrance and exit conveyor tables 11 and 12, respectively, for handling a workpiece such as an ingot or bloom 13 to be reduced by successive passes forth and back through the mill. The setting of the mill rolls is adjusted by the usual screws 14, driven by reversing motors under automatic control, the motors and control system therefor being indicated at 15. The apparatus described so far is conventional.

My invention concerns a selector controlled by the temperature of piece 13, effective to cause the screw motors to operate so that the piece will be reduced to the desired extent by drafts as heavy as permitted by such temperature without overloading the mill. To this end, I provide, in combination with the conventional apparatus already described, a bolometer 16 positioned to receive radiant energy from the workpiece when on table 11, and a digital voltmeter 17 connected thereto. The bolometer may be such as that described in Leeds & Northrup Catalog EN-S3. The voltmeter may be that described in Catalog 356 of Non-Linear Systems, Inc., Del Mar, California.

Figure 2 shows further details of the invention. The voltmeter 17 incorporates selector switches 18 and 19 of the rotary stepping type for selecting, in accordance with the temperature of piece 13, a reduction schedule appropriate to such temperature, or preventing movement of the piece to the mill if its temperature is too low. The zero or minimum temperature position of the stepping switches (zero or first fixed contact) connects in circuit to screw-operating mechanism 15 a lockout means 20, effective to prevent operation of the motor driving table 11, in the forward direction. The piece 13 is advanced to table 11 by a preceding conveyor table independently controlled.

The output signal from bolometer 16 which is proportional to the temperature of piece 13, suitably amplified, causes the voltmeter 17 to operate switches 18 and 19, the number of steps through which the switches operate being determined by the voltage applied to the voltmeter. When the switches stop in any particular position, they connect in circuit to mechanism 15 one of three rolling-schedule controllers 21, 22 and 23 such as described in A.I.E.E. Reprint 48-11, entitled "Improvements in Rolling-Mill Pre-Set Screw-Down Controllers," by J. D. Leitch et al., and in Booklet 9250 of Electric Controller & Mfg. Co., Cleveland, Ohio. These devices cause the mill screws to be reset automatically after each pass so as to effect reduction of the piece at a predetermined rate, e.g., slow, medium or fast.

It will be apparent from the foregoing that the invention automatically superimposes on the conventional screw-control system, a selection of a rate of reduction according to the temperature of the ingot or bloom to be rolled.

Figure 3 shows additional features desirable in a system such as that of Figure 2. Relays 24, 25, 26 and 27 are interposed between switch 18 and devices 20, 21, 22 and 23, respectively. Flag switches 28 and 29 are also provided. Switch 28 is actuated to closed position by the ingot 13 when it advances on table 11 to the mill. Switch 29 is normally in closed position until after rolling of the ingot has been finished and the piece moved away from the mill by table 12. Each relay has contacts such as 24a and 24b, closed when the winding of the relay is energized. The winding of each relay is shunted by a capacity such as 24c and has a resistor 24r in series therewith. The values of the capacitor and resistor are such as to give a current-time characteristic which prevents the voltage across the winding from rising above the operating value until switch 18 has come to rest at a position determined by the temperature of ingot 13. By means of the shunting capacitor and series resistor, energization of any of the relays 24, 25, 26 and 27 is prevented while the stepping switch is still in operation.

In operation of the system of Figure 3, when ingot 13 reaches the position to operate switch 28, and switch 18 is in starting position, voltage is applied to the circuit of the winding of relay 24. Unless switch 18 starts stepping before the winding is energized, it operates its contacts 24a and 24b. The former completes a holding circuit for the winding of the relay through switch 29. Contacts 24b when closed bring device 20 into operation.

If the temperature of ingot 13 is above the minimum rolling temperature, bolometer 16 and voltmeter 17 will cause switch 18 to start stepping before relay 24 can be energized sufficiently to close its contacts. When the switch stops in a position determined by the temperature of the ingot, as already explained, one of relays 25, 26 and 27 will operate after the necessary time interval has elapsed and thereupon complete its holding circuit and an energizing circuit for one of devices 21, 22 and 23. After the rolling of the ingot has been completed, delivery of the resulting bloom from the mill will strip switch 29, deenergizing the relay which operated and cause switch 18 to return to starting position.

It will be apparent from the foregoing that the invention permits the hot-rolling of a mass of metal at a rate proportional to its temperature. This increases the efficiency of the rolling operation by insuring that the reduction proceeds at the maximum permissible rate without overloading the rolls or mill housings. In addition, rolling will be interrupted if the temperature of the mass falls below the minimum value for safe rolling.

Although I have disclosed herein the preferred embodiment of my invention, I intend to cover as well any change or modification therein which may be made without departing from the spirit and scope of the invention.

I claim:

1. The combination with a reversing rolling mill having roll-adjusting screws, roller tables on opposite sides of the mill and means for operating said screws, of a plurality of rolling-schedule controllers and means responsive to the temperature of a workpiece on one of said tables effective to connect one of said controllers to said screw-operating means.

2. The combination defined in claim 1, characterized by said temperature-responsive means including a bolometer adjacent the entrance table and a selector switch controlled thereby.

3. The combination defined in claim 2, characterized by a relay for each of said controllers, said relays being connected to be energized by the selector switch in successive positions thereof.

4. The combination defined in claim 3, characterized by capacitance and resistance connected to said relay adapted to delay operation thereof.

5. The combination defined in claim 3, characterized by a flag switch operated by the workpiece in passing over the exit table, effective to deenergize said relays.

References Cited in the file of this patent

UNITED STATES PATENTS

| Re. 20,658 | Knight | Feb. 22, 1938 |
| 1,608,827 | Wilson | Nov. 30, 1926 |
| 1,764,312 | Jenks | June 17, 1930 |
| 2,360,995 | Whitten | Oct. 24, 1944 |
| 2,564,284 | Schurr | Aug. 14, 1951 |
| 2,708,254 | Macaulay et al. | May 10, 1955 |

FOREIGN PATENTS

| 317,885 | Germany | Dec. 31, 1919 |